United States Patent
Ooki

(10) Patent No.: US 8,501,847 B2
(45) Date of Patent: Aug. 6, 2013

(54) THERMOPLASTIC ELASTOMER RESIN COMPOSITION AND CONNECTOR

(75) Inventor: Yuusaku Ooki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 51 days.

(21) Appl. No.: 13/378,721

(22) PCT Filed: Aug. 9, 2010

(86) PCT No.: PCT/JP2010/063507
§ 371 (c)(1),
(2), (4) Date: Dec. 16, 2011

(87) PCT Pub. No.: WO2011/019026
PCT Pub. Date: Feb. 17, 2011

(65) Prior Publication Data
US 2012/0094539 A1    Apr. 19, 2012

(30) Foreign Application Priority Data

Aug. 10, 2009  (JP) ................. 2009/185657

(51) Int. Cl.
*C08C 19/02* (2006.01)
*H01R 13/40* (2006.01)
*C08F 2/00* (2006.01)
*C08F 36/00* (2006.01)
*C08F 12/02* (2006.01)

(52) U.S. Cl.
USPC ........... 524/147; 439/625; 526/346; 526/283; 526/233

(58) Field of Classification Search
USPC ............. 524/147; 439/625; 526/233, 283, 526/346
See application file for complete search history.

(56) References Cited

U.S. PATENT DOCUMENTS

| | | |
|---|---|---|
| 5,418,275 A | 5/1995 | Okada et al. |
| 5,543,462 A | 8/1996 | Okada et al. |
| 5,902,850 A | 5/1999 | Chino et al. |
| 6,031,049 A | 2/2000 | Chino et al. |
| 6,096,829 A | 8/2000 | Chino et al. |
| 6,469,081 B1 * | 10/2002 | Chino et al. ............ 524/261 |

FOREIGN PATENT DOCUMENTS

| | | |
|---|---|---|
| EP | 0 291 915 A2 | 11/1988 |
| EP | 0 810 263 A1 | 12/1997 |
| JP | 6-93153 A | 4/1994 |
| JP | 6-256607 A | 9/1994 |
| JP | 6-340705 A | 12/1994 |
| JP | 11-172061 A | 6/1999 |
| JP | 2000-265021 A | 9/2000 |
| JP | 2004-26899 A | 9/2004 |
| JP | 2005060499 A | 3/2005 |

OTHER PUBLICATIONS

International Search Report (PCT/ISA/210) dated Sep. 21, 2010, issued in International Application No. PCT/JP2010/063507.
Written Opinion (PCT/ISA/237) dated Sep. 21, 2010, issued in International Application No. PCT/JP2010/063507.
Extended European Search Report dated Feb. 5, 2013, issued by the European Patent Office in counterpart European Patent Application No. 10808209.0.

* cited by examiner

*Primary Examiner* — William Cheung
(74) *Attorney, Agent, or Firm* — Sughrue Mion, PLLC

(57) ABSTRACT

An object of the present invention is to provide a thermoplastic elastomer resin composition and a connector, which can be processed by mold forming and are excellent in the recycling property. The present invention provides a thermoplastic elastomer resin composition including 100 parts by weight of a base resin containing from 60 to 80 wt % of an acid-modified styrene-based elastomer and from 40 to 20 wt % of a syndiotactic polystyrene, and from 0 to 20 parts by weight of a hydrogenated dicyclopentadiene; and a connector using the composition.

4 Claims, 4 Drawing Sheets

THERMOPLASTIC ELASTOMER RESIN COMPOSITION AND CONNECTOR

This application is the International Stage of PCT Application No. PCT/JP2010/063507 filed Aug. 8, 2010, which claims priority of Japan Patent Application No. 2009-185657 filed Aug. 10, 2009.

TECHNICAL FIELD

The present invention relates to a thermoplastic elastomer resin composition and a connector using the thermoplastic elastomer resin composition.

BACKGROUND ART

In the industrial field such as automobile and home electric appliance, a seal material for sealing various members is generally used for the waterproofing purpose. Such a seal material is composed, for example, of an elastomer composition containing a thermosetting elastomer-made base material, a crosslinking agent and the like and having a crosslinked structure formed in the inside, or an elastomer composition described in Patent Document 1.

Also, in a wire harness routed in an automobile, for example, a waterproof connector 101 shown in FIG. 4 is used for preventing a liquid such as water from intruding into the connector to corrode a terminal fitting.

The waterproof connector 101 comprises a terminal fitting 102 formed by pressing an electrically conductive sheet metal or the like and a connector housing 103 for housing the terminal fitting 102. The terminal fitting 102 comprises an electric wire connection part fixed to an end 106a of an electric wire 106 to establish connection of the core wire of the electric wire 106, and an electric contact part connected to the terminal fitting of the other-party connector. The connector housing 103 is made of an insulating synthetic resin or the like and formed in a box shape. The connector housing 103 comprises a terminal housing chamber 103a for housing the terminal fitting 102 in the inside. In the terminal housing chamber 103a, a potting material 104 as a seal material is injected.

The potting material 104 is composed of, for example, a liquid silicone rubber or an epoxy resin. The potting material 104 injected into the terminal housing chamber 103a is cured by forming a crosslinked structure in the inside after a curing time under the predetermined temperature condition. Thanks to such curing of the potting material 104, a liquid such as water is prevented from intruding into the terminal housing chamber 103a, that is, the waterproof connector 101.

As for the waterproof connector not using the potting material, the following waterproof connector is known. This waterproof connector comprises a terminal fitting, a connector housing, as described above, and a tubular holder fixed to the outside surface of an electric wire and at the same time, fixed to the connector housing. In the connector housing, a concave part for housing the holder is provided.

On the inside of the holder, a tubular packing put into close adherence to both the inner surface of the holder and the outside surface of the electric wire is fixed. Also, on the outside of the holder, a tubular packing put into close adherence to both the outer surface of the holder and the inner surface of the concave part of the connector housing is fixed. Furthermore, in the portion between the electric wire connection part and the electric contact part of the terminal fitting, an O-ring put into close adherence to both the outer surface of the terminal fitting and the inner surface of the connector housing is fixed.

Thanks to the configuration above, the portion between the holder and the electric wire, the portion between the holder and the connector housing, that is, between the electric wire and the connector housing, or the portion between the terminal fitting and the connector housing is kept watertight, and a liquid such as water is prevented from intrusion into the waterproof connector.

RELATED ART DOCUMENT

Patent Document

Patent Document 1: JP-A-6-340705

SUMMARY OF THE INVENTION

Problems that the Invention is to Solve

However, the above-described waterproof connector 101 requires work for injecting the potting material 104 and therefore, suffers from a problem that the number of productions steps is large and the workability is bad. Also, a curing time for curing the potting material 104 is necessary, and this is disadvantageous in that the product stays in the production step during the curing time and the productivity decreases. Furthermore, the potting material 104 is injected into a wide space in the terminal housing chamber 103a, and there is a problem that the amount used is increased to raise the material cost.

In recent years, considering the environmental problem, at the automobile dismantling such as car disposal, the parts are required to be separated/recovered based on the material contained therein and subsequently recycled, but the seal material or potting material 104 described in Patent Document 1 contains a crosslinked structure in the inside and this gives rise to a problem that thermal deformation scarcely occurs even when reheated and the recycling property is bad.

Also, the waterproof connector not using the potting material 104 requires parts such as holder and packing and suffers from a problem that the number of parts or production steps is increased and the cost rises. In addition, there is a problem that the connecter grows in size due to the holder.

An object of the present invention is to solve these problems. That is, an object of the present invention is to provide a thermoplastic elastomer resin composition and a connector, which can be processed by mold forming and are excellent in the recycling property.

Means for Solving the Problems

In order to solve the above-described problems and attain the object, the following thermoplastic elastomer resin composition and connector are provided.

[1] A thermoplastic elastomer resin composition comprising 100 parts by weight of a base resin containing from 60 to 80 wt % of an acid-modified styrene-based elastomer and from 40 to 20 wt % of a syndiotactic polystyrene, and from 0 to 20 parts by weight of a hydrogenated dicyclopentadiene.

[2] The thermoplastic elastomer resin composition as described in [1] above, which further contains from 0.5 to 1.5 parts by weight of a phenolic antioxidant and from 1.0 to 3.0 parts by weight of a phosphorous acid ester-based antioxidant, per 100 parts by weight of the base resin.

[3] A connector, wherein at least a part of the members are formed of the thermoplastic elastomer resin composition described in [1] or [2] above.

[4] A connector comprising a terminal fitting having an electric contact part put into connection to a terminal fitting of the other-party connector and an electric wire connection part continuing from the electric contact part and being connected to the end of an electric wire, at least a part of the electric contact part being disposed in a first mold resin, the portion between the electric contact part and the first mold resin being sealed with an annular seal member, the electric wire connection part being embedded in the first mold resin, and the electric wire and the electric wire lead-out port of the first mold resin being sealed with a second mold resin, wherein the second mold resin is formed of the thermoplastic elastomer resin composition described in [1] or [2] above.

[5] The connector as described in [4] above, wherein the first mold resin is formed of a resin composition containing at least one resin selected from the group consisting of a polystyrene-based resin, a polyamide-based resin, a polyester-based resin, a modified polyphenylene ether and a polyphenylene sulfide.

Advantage of the Invention

According to the invention described in [1] above, the thermoplastic elastomer resin composition comprises 100 parts by weight of a base resin containing from 60 to 80 wt % of an acid-modified styrene-based elastomer and from 40 to 20 wt % of a syndiotactic polystyrene, and from 0 to 20 parts by weight of a hydrogenated dicyclopentadiene, so that the composition can be excellent in the heat resistance and adhesiveness (thermal adhesiveness) to other parts, ensuring excellent sealing property, and at the same time, can be processed by mold forming and therefore, enhanced in the workability and productivity. Also, since a crosslinked structure is not contained in the inside, the recycling property can be enhanced. Furthermore, the thermoplastic elastomer resin composition contains, as an arbitrary component, from 0 to 20 parts by weight of a hydrogenated dicyclopentadiene, so that the strength can be excellent and the tensile strength and percentage elongation at break can be more enhanced.

According to the invention described in [2] above, the thermoplastic elastomer resin composition further contains from 0.5 to 1.5 parts by weight of a phenolic antioxidant and from 1.0 to 3.0 parts by weight of a phosphorous acid ester-based antioxidant, per 100 parts by weight of the base resin, so that oxidative degradation can be prevented and the composition can be endowed with more excellent heat resistance.

According to the invention described in [3] above, at least a part of the members are formed of the thermoplastic elastomer resin composition described in [1] or [2] above, so that the connector can be a connector excellent in the sealing property and recycling property.

According to the invention described in [4] above, the second mold resin is formed of the above-described thermoplastic elastomer resin composition, so that the electric wire and the electric wire lead-out port can be sealed by mold forming, dispensing with potting material-injecting work or curing time, and the workability and productivity can be enhanced. Also, the amount of the composition used is small compared with the potting material and therefore, the material cost can be reduced. Furthermore, since the second mold resin does not contain a crosslinked structure, the recycling property can be enhanced.

According to the invention described in [5] above, the first mold resin is formed of a resin composition containing at least one resin selected from the group consisting of a polystyrene-based resin, a polyamide-based resin, a polyester-based resin, a modified polyphenylene ether and a polyphenylene sulfide, so that the terminal fitting can be embedded in a highly insulating resin composition. Also, a general resin composition can be used for the first mold resin and therefore, the material cost can be reduced.

MODE FOR CARRYING OUT THE INVENTION

Figure 1:
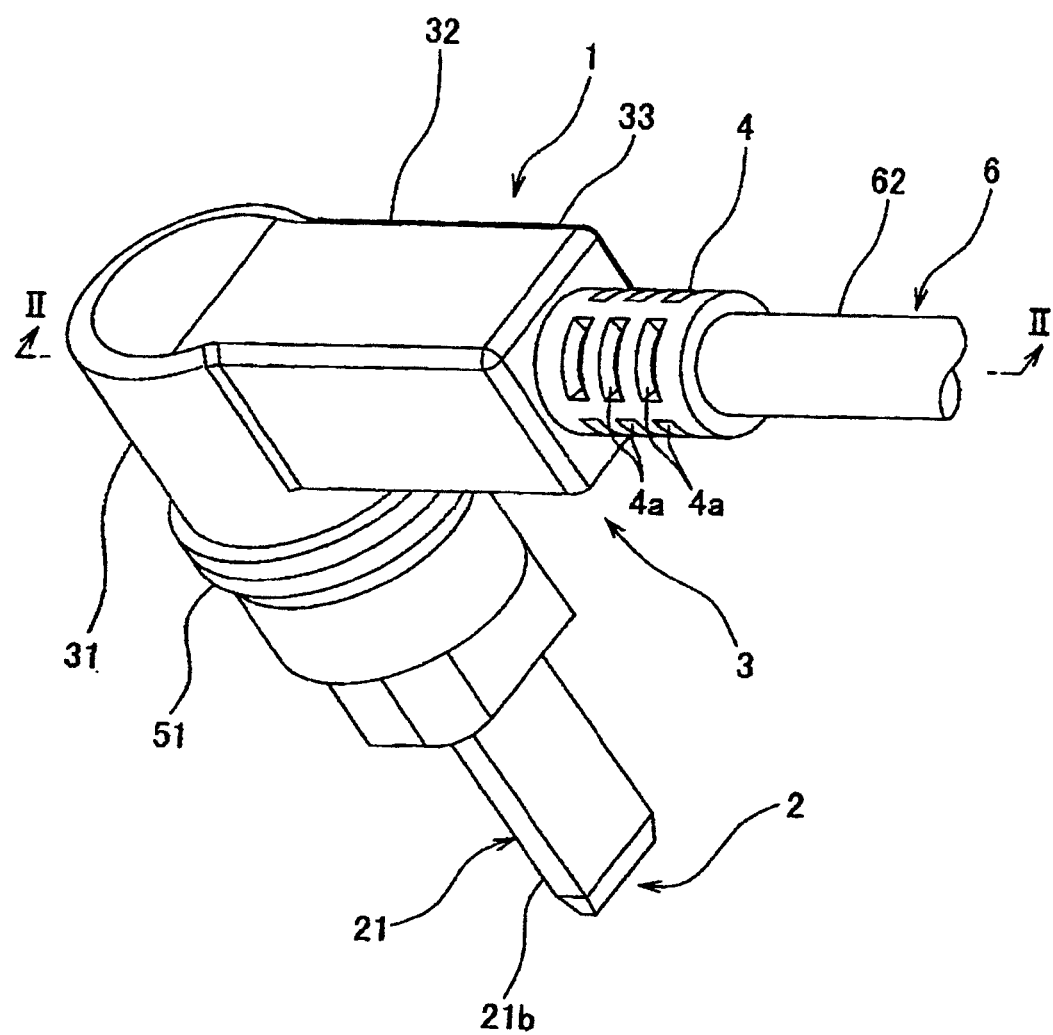
FIG. 1 A perspective view showing the connector according to one embodiment of the present invention.

The thermoplastic elastomer resin composition according to one embodiment of the present invention is described below. The thermoplastic elastomer resin composition according to one embodiment of the present invention comprises 100 parts by weight of a base resin consisting of from 60 to 80 wt % of an acid-modified styrene-based elastomer and from 40 to 20 wt % of a syndiotactic polystyrene, from 0.5 to 1.5 parts by weight of a phenolic antioxidant, from 1.0 to 3.0 parts by weight of a phosphorous acid ester-based antioxidant, and from 0 to 20 parts by weight of a hydrogenated dicyclopentadiene.

Examples of the acid-modified styrene-based elastomer include an acid-modified styrene-ethylene-butylene-styrene block copolymer (hereinafter, referred to as acid-modified SEBS) and an acid-modified styrene-butylene-styrene block copolymer (hereinafter, referred to as acid-modified SBS). These may be used individually or in combination. Also, the acid-modified styrene-based elastomer is not limited only to these copolymers and as long as the object of the present invention is not violated, an acid-modified styrene-based elastomer other than those described above may be also used.

The acid-modified SEBS is obtained by modifying the ethylene-butylene block in a styrene-ethylene-butylene-styrene block copolymer with an acid such as maleic anhydride. Also the acid-modified SBS is obtained by modifying the butylene block in a styrene-butylene-styrene block copolymer with an acid such as maleic anhydride. The acid-modified styrene-based elastomer has high adhesiveness to a metal or a resin compared with an unmodified styrene-based elastomer. As for the commercial product of such an acid-modified styrene-based elastomer, the acid-modified SEBS includes, for example, Tuftec M1913, trade name (produced by Asahi Kasei Chemicals Corp.).

The syndiotactic polystyrene (hereinafter, referred to as SPS) is a polystyrene where benzene rings are regularly and alternately disposed with respect to the main chain. The SPS is high in the heat resistance and chemical resistance compared with an atactic polystyrene (a polystyrene where benzene rings are randomly disposed with respect to the main chain). The commercial product of such SPS includes, for example, XAREC S104, trade name (produced by Idemitsu Kosan Co., Ltd.).

The base resin contains from 60 to 80 wt % of an acid-modified styrene-based elastomer and from 40 to 20 wt % of SPS and is preferably composed of an acid-modified styrene-based elastomer and SPS. If the content of the acid-modified styrene-based elastomer is less than 60 wt % (that is, the content of SPS exceeds 40 wt %), sufficient sealing property or adhesiveness cannot be obtained, whereas if the content of the acid-modified styrene-based elastomer exceeds 80 wt % (that is, the content of SPS is less than 20 wt %), adequate heat resistance is not obtained. The SPS exhibits good molecular dispersibility for the acid-modified styrene-based elastomer and since its glass transition temperature is high compared with polyethylene and polypropylene, the heat resistance of the base resin can be effectively enhanced.

Examples of the phenolic antioxidant include tris(3,5-di-tert-butyl-4-hydroxybenzyl)isocyanurate, 2,6-di-tert-butyl-4-methylphenol, tetrakis[methylene-3 (3',5'-di-tert-butyl-4-hydroxyphenyl)propionate]methane, octadecyl-3-(3,5-di-tert-butyl-4-hydroxyphenyl)propionate, 3,9-bis{2-[3-(3-tert-butyl-4-hydroxy-5-methylphenyl)propionyloxy]-1,1-dimethylethyl}-2,4,8,10-tetraoxaspiro[5.5]undecane, 1,3,5-tris-2[3(3,5-di-tert-butyl-4-hydroxyphenyl)propionyloxy]ethylisocyanate, 1,3,5-trimethyl-2,4,6-tris(3,5-di-tert-butyl-4-hydroxybenzyl)benzene, 1,3,5-tris(4-tert-butyl-3-hydroxy-2,6-dimethylbenzyl)isocyanurate, pentaerythritoltetrakis[3-(3,5-di-tert-butyl-4-hydroxyphenyl)propionate], triethylene glycol-N-bis-3-(3-tert-butyl-5-methyl-4-hydroxyphenyl)propionate, 1,6-hexanediolbis[3-(3,5-di-tert-butyl-4-hydroxyphenyl)propionate], 2,2-thiobis-diethylenebis[3-(3,5-di-tert-butyl-4-hydroxyphenyl) propionate], 2,2'-methylene-bis-(4-methyl-6-tert-butylphenol), 2,2'-methylene-bis-(4-ethyl-6-tert-butylphenol), 2,2'-methylene-bis-(4,6-di-tert-butylphenol), 2,2'-ethylidene-bis-(4,6-di-tert-butylphenol) (CHEMINOX 1129), 2,2'-butylidene-bis-(4-methyl-6-tert-butylphenol), 4,4'-butylidenebis(3-methyl-6-tert-butylphenol), 2-tert-butyl-6-(3-tert-butyl-2-hydroxy-5-methylbenzyl)-4-methylphenyl acrylate, 2,4-di-tert-amyl-6-[1-(3,5-di-tert-amyl-2-hydroxyphenyl)ethyl]phenyl acrylate, and tocopherols. Specific examples of the tocopherols include α-tocopherol (5,7,8-trimethyltocol), (β-tocopherol (5,8-dimethyltocol), γ-tocopherol (7,8-dimethyltocol), and δ-tocopherol (8-methyltocol). One of these may be used alone, or two or more thereof may be used in combination. Also, the phenolic antioxidant is not limited only to these compounds and as long as the object of the present invention is not violated, a phenolic antioxidant other than those described above may be used.

The phenolic antioxidant is preferably added to account for from 0.5 to 1.5 parts by weight per 100 parts by weight of the base resin. If the content of the phenolic antioxidant is less than 0.5 parts by weight, the resin composition may be degraded by oxidation ascribable particularly to a radical and the heat resistance may be reduced. Also, even if the content of the phenolic antioxidant exceeds 1.5 parts by weight, the heat resistance is scarcely enhanced in association with the increase in the amount added but the sealing property or adhesiveness may be reduced or bleed may be generated on the resin composition surface.

Examples of the phosphorous acid ester-based antioxidant include tris(2,4-di-tert-butylphenyl)phosphite, bis[2,4-bis(1,1-dimethylethyl)-6-methylphenyl]ethyl ester phosphorous acid, tetrakis(2,4-di-tert-butylphenyl) [1,1-biphenyl]-4,4'-diylbisphosphonite, bis(2,4-di-tert-butylphenyl)pentaerythritol diphosphite, distearylpentaerythritol diphosphite, triphenyl phosphite, tetraphenyl dipropylene glycol diphosphite, tetraphenyltetra(tridecyl)pentaerythritol tetraphosphite, tetra (C12-C15 alkyl)-4,4'-isopropylidene phenylphosphite, bis (tridecyl)pentaerythritol diphosphite, bis(nonylphenyl)pentaerythritol diphosphite, 4,4'-butylidenebis(3-methyl-6-tert-butylphenyl-ditridecylphosphite), tristearyl phosphite, hydrogenated bisphenol A.entaerythritol phosphite polymer, hydrogenated bisphenol A.phosphite polymer, trisnonylphenyl phosphite, tricresyl phosphite, triethyl phosphite, tris(2-ethylhexyl)phosphite, tridecyl phosphite, trilauryl phosphite, tris(tridecyl)phosphite, trioleyl phosphite, diphenylmono(2-ethylhexyl)phosphite, diphenylmonodecyl phosphite, diphenylmono(tridecyl)phosphite, trilauryl trithiophosphite, diethyl hydrogenphosphite, dilauryl hydrogenphosphite, dioleyl hydrogenphoshite, and diphenyl hydrogenphosphite. One of these may be used alone, or two or more thereof may be used in combination. Also, the phosphorous acid ester-based antioxidant is not limited only to these compounds and as long as the object of the present invention is not violated, a phosphorous acid ester-based antioxidant other than those described above may be used.

The phosphorous acid ester-based antioxidant is preferably added to account for 1.0 to 3.0 parts by weight per 100 parts by weight of the base resin. If the content of the phosphorous acid ester-based antioxidant is less than 1.0 parts by weight, the resin composition may be degraded by oxidation ascribable to a peroxide generated particularly under high temperature, for example, during shaping and the heat resistance may be reduced. Also, even if the content of the phosphorous acid ester-based antioxidant exceeds 3.0 parts by weight, the heat resistance is scarcely enhanced in association with the increase in the amount added but the sealing property or adhesiveness may be reduced or bleed may be generated on the resin composition surface.

The thermoplastic elastomer resin composition having the above-described configuration may further contain, as an arbitrary component, from 0 to 20 parts by weight of a hydrogenated dicyclopentadiene (hereinafter, referred to as hydrogenated DCPD) per 100 parts by weight of the base resin. The hydrogenated DCPD is a dicyclopentadiene in which hydrogen is added to the carbon double bond of the dicyclopentadiene, and the hydrogenation ratio is not particularly limited. The hydrogenated DCPD enhances the strength (hardness), tensile strength and percentage elongation at break of the resin composition. The commercial product of such hydrogenated DCPC includes, for example, Oppera PR130J (produced by Exxon Mobil Corp.).

The hydrogenated DCPD is added to account for 0 to 20 parts by weight per 100 parts by weight of the base resin. If the content of the hydrogenated DCPD exceeds 20 parts by weight, the heat resistance is reduced.

The thermoplastic elastomer resin composition of the present invention is formulated in the above-described configuration. By containing an acid-modified styrene-based elastomer, the adhesiveness to a metal or a resin is enhanced; by containing SPS, the heat resistance is enhanced; and by containing a phenolic antioxidant or a phosphorous acid ester-based antioxidant, oxidative degradation is prevented and the heat resistance is more enhanced. Furthermore, by containing hydrogenated DCPD as an arbitrary component, the strength (hardness), tensile strength and percentage elongation at break are improved.

Incidentally, the thermoplastic elastomer resin composition of the present invention has sufficient heat resistance even without containing the phenolic antioxidant or phosphorous acid ester-based antioxidant above. However, by containing such an antioxidant in an amount of the above-described parts by weight, the heat resistance can be more enhanced. Also, the thermoplastic elastomer resin composition may contain various additives (for example, a stabilizer such as light stabilizer, a flame retardant, an antistatic agent, a filler and a colorant) within the range not impairing the effects of the present invention.

The thermoplastic elastomer resin composition formulated in the above-described configuration is melt-kneaded and obtained as a so-called polymer alloy. As for the melt-kneading method, various known techniques may be used. For example, the components are previously pre-blended using a high-speed mixing apparatus or the like such as Henschel mixer and then melt-kneaded using a single-screw extruder, a twin-screw extruder or the like, and the melt is injected into a mold and formed into a desired shape, for example, a water-stopping part 4 of the later-described connector 1. The thus-formed thermoplastic elastomer resin composition does not contain a crosslinked structure in the inside and therefore, can be re-formed by heating it at not less than a given temperature and easily recycled.

Figure 2:
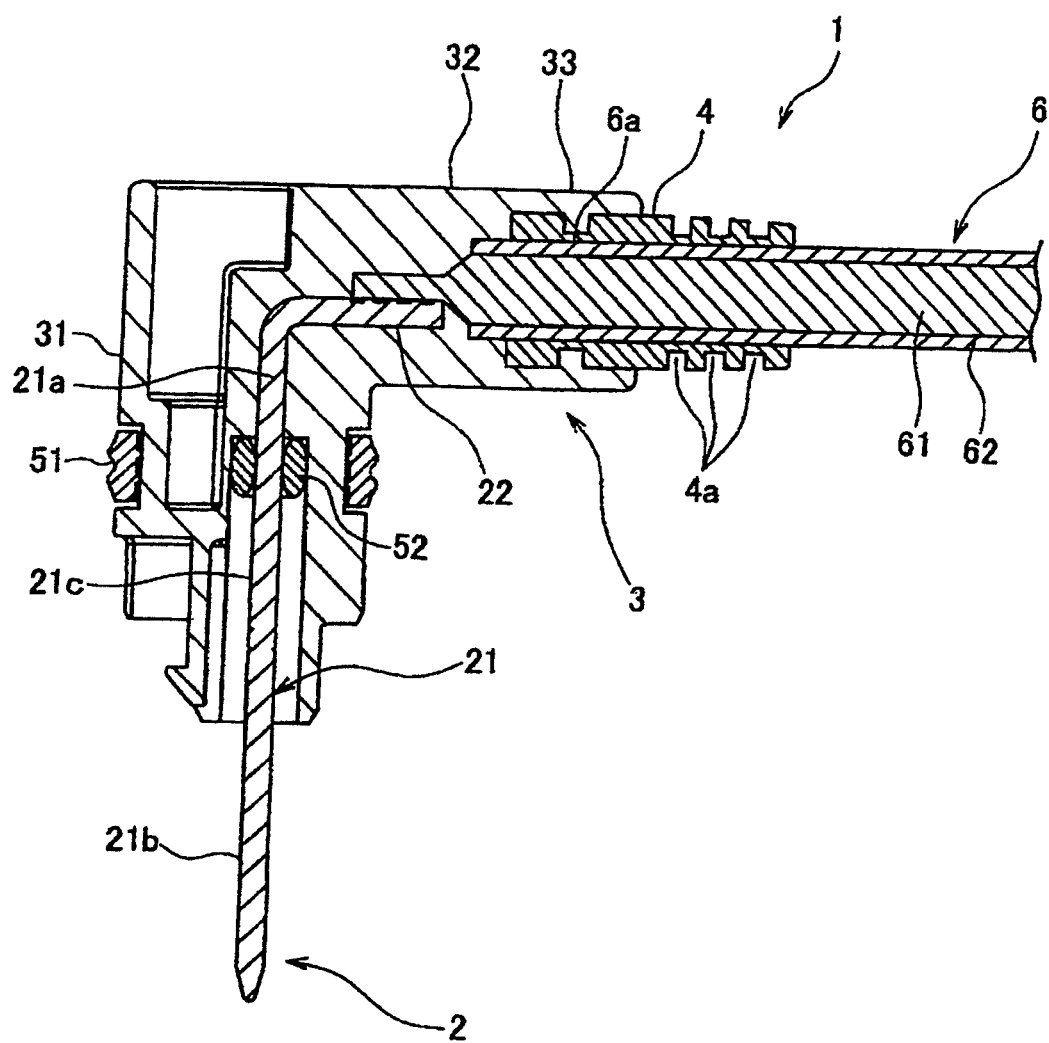
FIG. 2 A cross-sectional view along the line II-II in FIG. 1.

The connector using the thermoplastic elastomer resin composition of the present invention is described below by referring to FIGS. 1 and 2. As shown in FIG. 1, the connector 1 comprises a terminal fitting 2, a housing part 3, and a water-stopping part 4.

The terminal fitting 2 is formed, for example, by bending an electrically conductive sheet metal or the like. The terminal fitting 2 is composed, for example, of a copper alloy such as brass. Also, the terminal fitting 2, either in a sheet metal state before bending or in a terminal fitting 2 state after bending, may be plated with tin, silver or gold. That is, the outside surface of the terminal fitting 2 is composed of a copper alloy, tin, silver or gold. As shown in FIG. 2, the terminal fitting 2 is a so-called male-type terminal fitting, and this terminal fitting integrally comprises an electric contact part 21 and an electric wire connection part 22 and is formed in an L-shape.

The electric contact part 21 is formed in a belt-like shape. The base end part 21a on the electric wire connection part 22 side of the electric contact part 21 is embedded in the housing part 3. The distal part 21b of the electric contact part 21 projects from the housing part 3 and is electrically connected to the terminal fitting (not shown) of the other-party connector. The central part 21c of the electric contact part 21 is disposed in the housing part 3 in a state of leaving a gap between the central part and the inner surface of the housing part 3. At the end on the base end part 21a side of the central part 21c, an O-ring 52 as an annular seal member composed of an elastic material such as rubber is fixed.

The electric wire connection part 22 is formed in a belt-like shape and embedded in the housing part 3. The electric wire connection part 22 is provided to bend from the electric contact part 21 and be perpendicular to the electric contact part 21. In the example shown in the Figure, the angle between the electric wire connection part 22 and the electric contact part 21 is nearly 90°.

On the electric wire connection part 22, a core wire 61 exposed to the end 6a of the later-described electric wire 6 is placed. The electric wire connection part 22 and the core wire 61 are connected by ultrasonic welding or heat welding. By way of ultrasonic welding or heat welding, the electric wire connection part 22 is electrically and mechanically connected to an electric wire 6. As for the method to connect the electric wire connection part 22 and the electric wire 6, the core wire 61 may be caulked with a caulking piece by providing the caulking piece in the electric wire connection part 22.

The electric wire 6 is a so-called cable. As shown in FIG. 2, the electric wire 6 comprises an electrically conductive core wire 61 and an insulating coat part 62. The core wire 61 is composed of a single wire. The single wire constituting the core wire 61 is made of an electrically conductive metal such as copper and aluminum. Incidentally, the core wire 61 may be formed by twisting a plurality of wires.

The coat part 62 is made of an insulating synthetic resin or the like and, for example, composed of a synthetic resin such as polyethylene-based resin, polypropylene-based resin and polyvinyl chloride resin. That is, the outside surface of the coat part 62 is composed of a synthetic resin such as polyethylene-based resin, polypropylene-based resin and polyvinyl chloride resin. The coat part 62 covers the core wire 61. The coat part 62 is peeled at the end 6a of the electric wire 6 to expose the core wire 61.

The housing part 3 is composed of a first mold resin, and the base end part 21a of the electric contact part 21 as well as the electric wire connection part 22 of the terminal fitting 2 and the end 6a of the electric wire 6, where the water-stopping part 4 is formed, are embedded therein. The first mold resin is a resin composition different from the thermoplastic elastomer resin composition of the present invention. The first mold resin includes a known resin composition used as a material constituting the connector housing of a general connector. Above all, the mold resin is preferably formed of a resin composition containing at least one resin selected from the group consisting of a polystyrene-based resin, a polyamide-based resin, a polyester-based resin, a modified polyphenylene ether and a polyphenylene sulfide, more preferably formed of a resin composition containing a syndiotactic polystyrene resin.

The housing part 3 is shaped integrally with the terminal fitting 2 and the electric wire 6 having formed thereon the water-stopping part 4, by mold forming. As shown in FIG. 1, the housing part 3 integrally comprises a cylindrical part 31 and an angular tube part 32 continuing from the cylindrical part 31 and is formed in an L-shape as a whole. On the outside surface of the cylindrical part 31, a tubular packing 51 composed of an elastic material such as rubber is fixed.

The cylindrical part 31 is formed in a cylindrical shape. Inside of the cylindrical part 31, the base end part 21a of the electric contact part 21 of the terminal fitting 2 is embedded in a state of the inner surface of the cylindrical part being tightly contacted with the outside surface of the base end part 21a (not necessarily watertight). Also the cylindrical part 31 houses the central part 21c of the electric contact part 21 in the inside in a state of leaving a gap between the inner surface and the outside surface of the central part 21c. In this gap, the above-described O-ring 52 fixed in the central part 21c is located. The O-ring 52 closely adheres (watertight) to the inner surface of the cylindrical part 31 and the outside surface of the central part 21c. The portion between the electric contact part 21 and the housing part 3 is kept watertight (sealed) by the O-ring 52 to prevent a liquid such as water sliding down the distal part 21b of the electric contact part 21 from intruding into the housing part 3.

The angular tube part 32 is formed in an angular tube shape. The angular tube part 32 is provided to continue from the end of the cylindrical part 31 and be orthogonal to the cylindrical part 31. Inside of the angular tube part 32, the electrical wire connection part 22 of the terminal fitting 2 and the end 6a of the electric wire 6, where the water-stopping part 4 is formed, are embedded. The inner surface of the angular tube part 32 is tightly contacted with the outside surface of the electrical wire connection part 22, the core wire 61 of the electric wire 6, and the outside surface of the coat part 62. Also, the inner surface of the angular tube part 32 closely adheres to the outside surface of the water-stopping part. The end of the angular tube part 32, which is remote from the cylindrical part 31, serves as the electric wire lead-out port 33.

The electric wire lead-out port 33 is formed in an angular tube shape and guides the electric wire 6 having formed thereon a water-stopping part 4 to the outside of the housing part 3. The inner surface of the electric wire lead-out port 33 closely adheres to the outside surface of the water-stopping part 4, and the portion between the inner surface and the water-stopping part 4 is kept watertight.

The water-stopping part 4 is composed of a second mold resin and seals the portion between the electric wire lead-out port 33 and the end 6a of the electric wire 6. The second mold resin is formed of the thermoplastic elastomer resin composition of the present invention. The thermoplastic elastomer resin composition of the present invention is preferred because of its excellent adhesiveness to the first mold resin or the synthetic resin constituting the coat part 62 of the electric wire 6, such as polyethylene-based resin, polypropylene-based resin and polyvinyl chloride resin. Also, the thermoplastic elastomer resin composition of the present invention is excellent in the heat resistance and therefore, for example, a connector 1 is advantageously kept from breakage even when disposed under a severe temperature condition such as in an engine room of automobile.

As shown in FIG. 1, the water-stopping part 4 is formed in a cylindrical shape. The water-stopping part 4 is shaped integrally with the electric wire 6 and the housing part 3 by mold forming. As shown in FIG. 2, the water-stopping part 4 is continuously provided over a region from the outside surface of the coat part 62 of the electric wire 6 in the portion embedded in the housing part 3 to the outside surface in the portion disposed outside of the housing part 3 and closely adheres to the outside surface of the coat part 62. Also, the water-stopping part 4 closely adheres to the inner surface of the electric wire lead-out port 33. Such a water-stopping part 4 seals the portion between the electric wire 6 and the electric wire lead-out port 33 to keep the portion watertight and prevent a liquid such as water sliding down the electric wire 6 from intruding into the housing part 3 and attaching to the terminal fitting 2.

On the outside surface of the water-stopping part 4 located outside of the housing part 3, as shown in FIG. 1, a groove 4a is provided. The groove 4a is provided along the circumferential direction of the water-stopping part 4 and a plurality of grooves are provided to align along the circumferential direction. Furthermore, a plurality of grooves 4a are provided with a spacing from each other along the central axis of the water-stopping part 4. Thanks to these grooves 4a, bending of the water-stopping part 4 and in turn, bending of the electric wire 6 inside the water-stopping part 4 are facilitated, and the degree of freedom at the electric wire 6 routing is increased.

At the time of producing a connector 1 having the above-described configuration, first, the electric wire connection part 22 of the terminal fitting 2 is fixed to the electric wire 6 before forming the water-stopping part 4, by ultrasonic welding or heat welding. Next, the water-stopping part 4 is mold-formed in the coat part 62 at the end 6a of the electric wire 6. That is, the end 6a of the electric wire 6 is fixed at a predetermined position within a first mold (not shown) used for mold-forming the water-sopping part 4, and shaping of the melt-kneaded second mold resin, that is, the thermoplastic elastomer resin composition of the present invention, is performed in the first mold. After the shaping, the integrally formed electric wire 6 and water-stopping part 4 are taken out of the first mold.

Subsequently, the housing part 3 is mold-formed. That is, the end 6a of the electric wire 6 having formed thereon the water-stopping part 4, and the base end part 21a of the electric contact part 21 as well as the electric wire connection part 22 of the terminal fitting 2 fixed to the electric wire 6 are fixed at predetermined positions within a second mold (not shown) used for mold-forming the housing part 3, and shaping of the melt-kneaded first mold resin is performed in the second mold. After the shaping, the integrally formed terminal fitting 2, housing part 3 and electric wire 6 are taken out of the second mold. Finally, the O-ring 52 is fixed to closely adhere to both the central part 21c of the electric contact part 21 of the terminal fitting 2 and the inner surface of the cylindrical part 31 of the housing part 3, and the portion between the terminal fitting 2 and the housing part 3 is thereby made watertight. In this way, the connector 1 shown in FIGS. 1 and 2 is produced.

According to this embodiment, the thermoplastic elastomer resin composition comprises 100 parts by weight of a base resin containing from 60 to 80 wt % of an acid-modified styrene-based elastomer and from 40 to 20 wt % of SPS, and from 0 to 20 parts by weight of hydrogenated DCPD, so that the composition can be excellent in the heat resistance and adhesiveness (thermal adhesiveness) to other parts, ensuring excellent sealing property, and at the same time, can be processed by mold forming and therefore, enhanced in the workability and productivity. Also, since a crosslinked structure is not contained in the inside, the recycling property can be enhanced. Furthermore, the thermoplastic elastomer resin composition contains, as an arbitrary component, from 0 to 20 parts by weight of hydrogenated DCPD, so that the strength can be excellent and the tensile strength and percentage elongation at break can be more enhanced.

Also, the thermoplastic elastomer resin composition further contains from 0.5 to 1.5 parts by weight of a phenolic antioxidant and from 1.0 to 3.0 parts by weight of a phosphorous acid ester-based antioxidant, per 100 parts by weight of the base resin, so that oxidative degradation can be prevented and the composition can be endowed with more excellent heat resistance.

In addition, the second mold resin is formed of the thermoplastic elastomer resin composition of the present invention, so that the electric wire 6 and the electric wire lead-out port 33 can be sealed by mold forming, dispensing with potting material-injecting work or curing time, and the workability and productivity can be enhanced. Also, the amount of the composition used is small compared with the potting material and therefore, the material cost can be reduced. Furthermore, since the second mold resin does not contain a crosslinked structure, the recycling property can be enhanced.

The first mold resin is formed of a resin composition containing at least one resin selected from the group consisting of a polystyrene-based resin, a polyamide-based resin, a polyester-based resin, a modified polyphenylene ether and a polyphenylene sulfide, so that the terminal fitting 2 can be embedded in a highly insulating resin composition. Also, a general resin composition can be used for the first mold resin and therefore, the material cost can be reduced.

In the embodiment above, a case of using the thermoplastic elastomer resin composition of the present invention for a connector 1 is described, but the thermoplastic elastomer resin composition of the present invention may be of course used for sealing of other articles.

Figure 3:
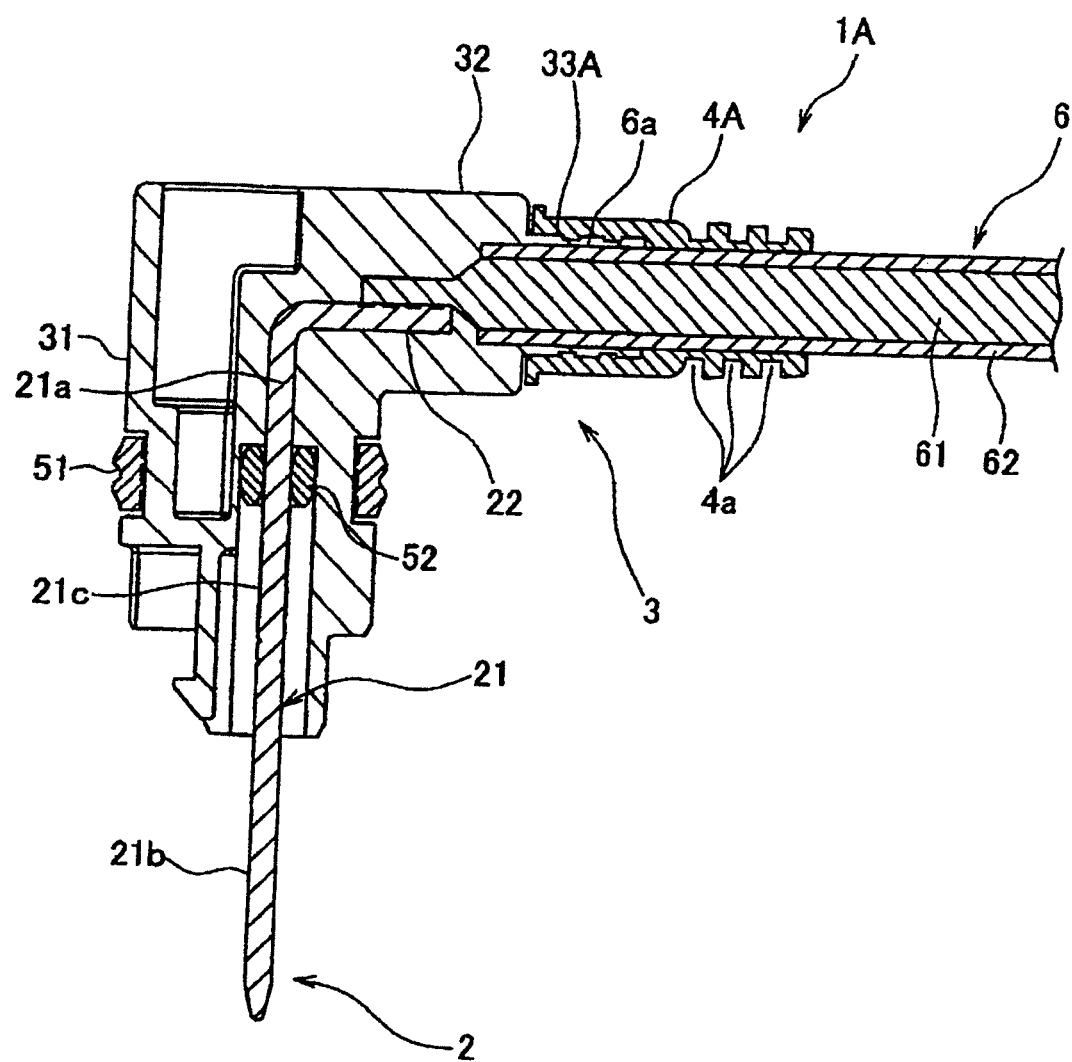
FIG. 3 A cross-sectional view showing a modification example of the connector shown in FIG. 2.
Figure 4:
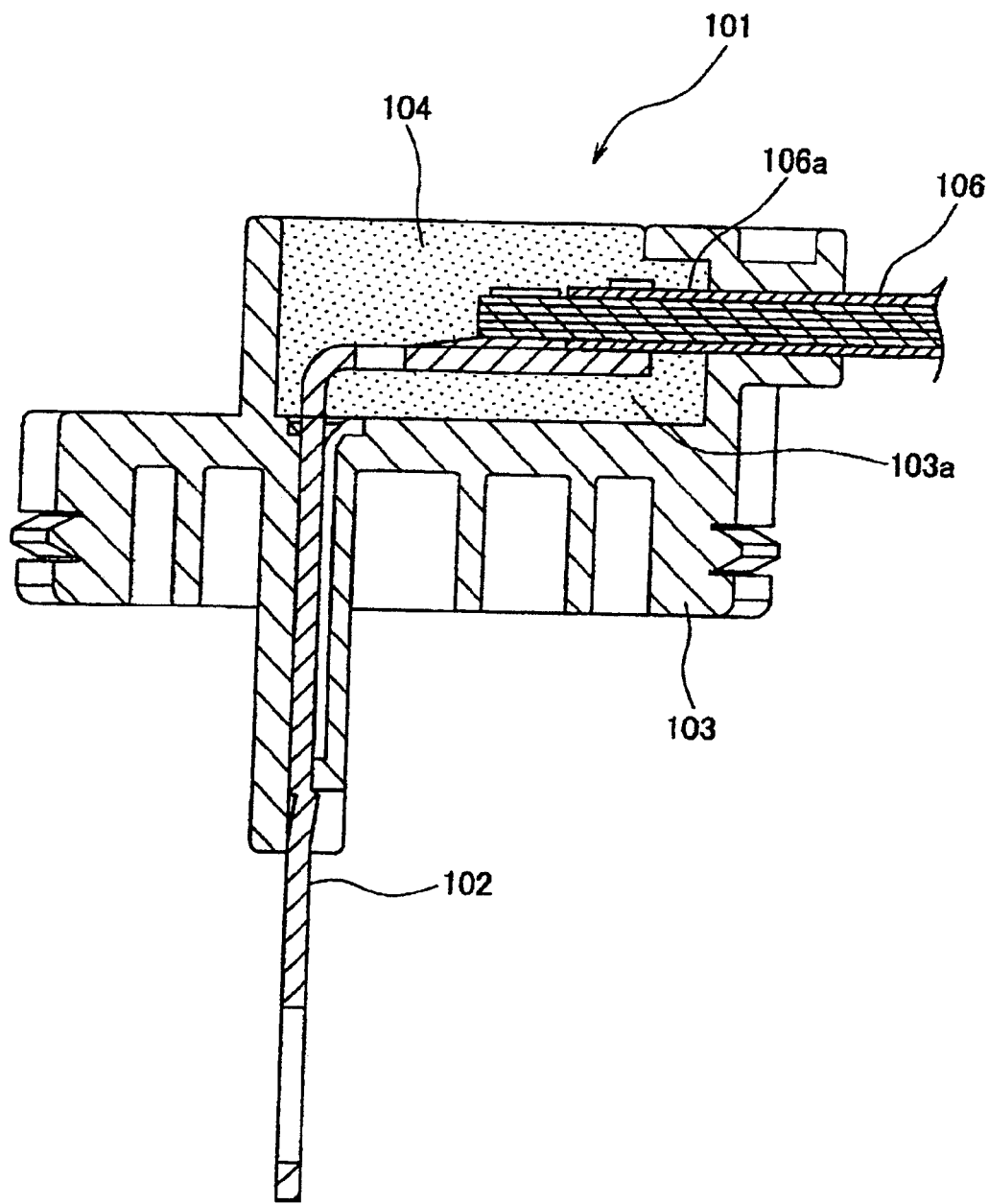
FIG. 4 A cross-sectional view showing a conventional connector.

Also, in the connector 1, the housing part 3 is mold-formed after mold-forming the water-stopping part 4, but the connector 1 may be a connector 1A shown in FIG. 3 and the water-stopping part 4A may be mold-formed after mold-forming the housing part 3. Incidentally, for the same constituent portions as in the embodiment above, like numerals are used and their description are omitted.

The electric wire lead-out port 33A of the housing part 3 is formed in a cylindrical shape with the outer diameter being smaller than that of the angular tube part 32. The water-stopping part 4A is continuously provided over a region from the outside surface of the electric wire lead-out port 33A to the outside surface of the coat part 62 at the end 6a of the electric wire 6 guided through the electric wire lead-out port 33A and is formed to cover the electric wire lead-out port 33A and the end 6a of the electric wire 6. The water-stopping part 4A closely adheres to both the outside surface of the electric wire lead-out port 33A and the outside surface of the coat part 62 at the end 6a of the electric wire 6. This water-stopping part 4A seals the portion between the electric wire 6 and the electric wire lead-out port 33A to keep the portion watertight and prevent a liquid such as water sliding down the electric wire 6 from intruding into the housing part 3 and attaching to the terminal fitting 2.

The above-described embodiments are merely a representative embodiment of the present invention, and the present invention is not limited to these embodiments. That is, the present invention can be performed by making various modifications therein within the range not deviating from the gist of the present invention.

EXAMPLES

Example 1

A base resin was prepared by blending 70 wt % of acid-modified SEBS (Tuftec M1913, produced by Asahi Kasei Chemicals Corp.) as the acid-modified styrene-based elastomer and 30 wt % of SPS (XAREC 5104, produced by Idemitsu Kosan Co., Ltd.), and 1.5 parts by weight of a phenolic antioxidant (IRGANOX 3114, produced by Ciba Specialty Chemicals) and 2.0 parts by weight of a phosphorous acid ester-based antioxidant (ADK STAB 2112, produced by ADEKA Corp.) were blended per 100 parts by weight of the base resin. These were mixed in a Henschel mixer, and the mixture was melt-kneaded using a same-direction twin-screw extruder (φ40 mm, L/D=45) and extrusion-formed at an extrusion speed of 600 mm/min to form a columnar pellet (φ3.0 mm).

As for the heater of the twin-screw extruder above, 6 heaters in total, that is, 5 heaters provided in a line along the longitudinal direction of the cylinder between the hopper port and the head for heating the inside of the cylinder and 1 heater for heating the head, are provided. These heaters were set to a temperature of 230° C., 255° C., 270° C., 240° C., 240° C. and 250° C., respectively, from the hopper port toward the head. At this time, the actual temperature of the melted thermoplastic elastomer resin composition was about 280° C.

Example 2

A base resin was prepared by blending 75 wt % of the acid-modified SEBS above and 25 wt % of the SPS above, 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Example 3

A base resin was prepared by blending 80 wt % of the acid-modified SEBS above and 20 wt % of the SPS above, 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Example 4

A base resin was prepared by blending 70 wt % of the acid-modified SEBS above and 30 wt % of the SPS above, 10 parts by weight of hydrogenated DCPD (Oppera PR130J, produced by Exxon Mobil Corp.), 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Example 5

A base resin was prepared by blending 75 wt % of the acid-modified SEBS above and 25 wt % of the SPS above, 10 parts by weight of the hydrogenated DCPD above, 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Example 6

A base resin was prepared by blending 80 wt % of the acid-modified SEBS above and 20 wt % of the SPS above, 10 parts by weight of the hydrogenated DCPD above, 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Example 7

A base resin was prepared by blending 75 wt % of the acid-modified SEBS above and 25 wt % of the SPS above, 0.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Example 8

A base resin was prepared by blending 75 wt % of the acid-modified SEBS above and 25 wt % of the SPS above, 1.5 parts by weight of the phenolic antioxidant above and 1.0 parts by weight of the phosphorous acid ester-based antioxidant above were blended per 100 parts by weight of the base resin, and thereafter, a columnar pellet was formed in the same manner as in Example 1.

Example 9

A base resin was prepared by blending 75 wt % of the acid-modified SEBS above and 25 wt % of the SPS above, 1.5 parts by weight of the phenolic antioxidant above and 3.0 parts by weight of the phosphorous acid ester-based antioxidant above were blended per 100 parts by weight of the base resin, and thereafter, a columnar pellet was formed in the same manner as in Example 1.

Example 10

A base resin was prepared by blending 75 wt % of the acid-modified SEBS above and 25 wt % of the SPS above, 5 parts by weight of the hydrogenated DCPD above, 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Example 11

A base resin was prepared by blending 75 wt % of the acid-modified SEBS above and 25 wt % of the SPS above, 20 parts by weight of the hydrogenated DCPD above, 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Example 12

A base resin was prepared by blending 75 wt % of the acid-modified SEBS above and 25 wt % of the SPS above, 0.2 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Example 13

A base resin was prepared by blending 75 wt % of the acid-modified SEBS above and 25 wt % of the SPS above, 1.5 parts by weight of the phenolic antioxidant above and 0.5 parts by weight of the phosphorous acid ester-based antioxidant above were blended per 100 parts by weight of the base resin, and thereafter, a columnar pellet was formed in the same manner as in Example 1.

Example 14

A base resin was prepared by blending 75 wt % of the acid-modified SEBS above and 25 wt % of the SPS above, 2.0 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Example 15

A base resin was prepared by blending 75 wt % of the acid-modified SEBS above and 25 wt % of the SPS above, 1.5 parts by weight of the phenolic antioxidant above and 4.0 parts by weight of the phosphorous acid ester-based antioxidant above were blended per 100 parts by weight of the base resin, and thereafter, a columnar pellet was formed in the same manner as in Example 1.

Comparative Example 1

A base resin was prepared by blending 90 wt % of the acid-modified SEBS above and 10 wt % of the SPS above, 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Comparative Example 2

A base resin was prepared by blending 50 wt % of the acid-modified SEBS above and 50 wt % of the SPS above, 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Comparative Example 3

A base resin was prepared by blending 30 wt % of the acid-modified SEBS above and 70 wt % of the SPS above, 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Comparative Example 4

A base resin was prepared by blending 90 wt % of the acid-modified SEBS above and 10 wt % of the SPS above, 10 parts by weight of the hydrogenated DCPD above, 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

Comparative Example 5

A base resin was prepared by blending 75 wt % of the acid-modified SEBS above and 25 wt % of the SPS above, 30 parts by weight of the hydrogenated DCPD above, 1.5 parts by weight of the phenolic antioxidant above and 2.0 parts by weight of the phosphorous acid ester-based antioxidant above were blended per 100 parts by weight of the base resin, and thereafter, a columnar pellet was formed in the same manner as in Example 1.

The formed articles obtained in Examples 1 to 15 and Comparative Examples 1 to 5 were subjected to the following evaluations (evaluation of sealing property, evaluation of adhesiveness, evaluation of heat resistance), and the results are shown together in Tables 1 to 3. Also, the formed articles obtained in Examples 1 and 4 and Comparative Examples 1 and 4 were measured for the following physical properties (specific gravity, hardness, tensile strength, percentage elongation at break), and the results are shown together in Table 4.

(Evaluation of Sealing Property)

A connector 1 shown in FIG. 1 was produced using the thermoplastic elastomer of the present invention formed into a pellet as above, the connector 1 was set on an aluminum-made jig and immersed in water, a tube was passed through the jig, a compressed air of 10.0 kPa was fed between the water-stopping part 4 and the electric wire 6 from the tube for 30 seconds, and the leakage of the compressed air from between the water-stopping part 4 and the housing part 3 was observed. When leakage of the compressed air was not observed, the pressure of the compressed air was raised in steps of 10.0 kPa. The pressure of the compressed air when leakage was observed was taken as the seal pressure, and the sealing property was judged as passed (A) when the seal pressure was 200 kPa or more, judged as practically no problem (B) when from 100 kPa to less than 200 kPa, and judged as failed (C) when less than 100 kPa.

(Evaluation of Adhesiveness)

The evaluation was performed in accordance with JIS K 6854-2 (2008). Together with a sheet-like formed article (polystyrene-based resin, length: 150.0 mm, width: 25.0 mm, thickness: 3.0 mm) as the adherend, the thermoplastic elastomer of the present invention formed into a pellet as above was integrally formed into a sheet (length: 100.0 mm, width 20.0 mm, thickness: 3.0 mm) by using an injection molding machine to prepare a test piece, and a 180° peel test was performed by an autograph (manufactured by Shimadzu Corp.). The adhesiveness was judged as passed (A) when the peel adhesive strength was 1.0 N/mm or more, judged as practically no problem (B) when from 0.3 N/mm to less than 1.0 N/mm, and judged as failed (C) when less than 0.3 N/mm.

(Evaluation of Heat Resistance)

The thermoplastic elastomer of the present invention formed into a pellet as above was formed into a sheet by a twin roller, further formed into a sheet by an electrically heated press and then cut (length: 100.0 mm, width: 20.0 mm, thickness: 2.0 mm) to prepare a test piece, and after heating and aging by leaving it at 140° C. for 120 hours, the heat resistance was judged as passed (A) when the outer appearance was less discolored and cracking was not generated in the outside surface of the formed article by 180° bending, judged as passed (B) when the discoloration of the outer appearance was moderate and the cracking above was not generated, and judged as failed (C) when the outer appearance was greatly discolored and the cracking above was generated.

(Measurement of Specific Gravity)

The measurement was performed in accordance with JIS K7112 Method A (2008). The thermoplastic elastomer of the present invention formed into a pellet as above was formed into a sheet by a twin roll, further formed into a sheet by an electrically heated press and then cut (length: 30.0 mm, width: 20.0 mm, thickness: 2.0 mm) to prepare a test piece.

(Measurement of Hardness)

The measurement was performed in accordance with JIS K6253 (2008). The thermoplastic elastomer of the present invention formed into a pellet as above was formed into a sheet by a twin roll, further formed into a sheet by an electrically heated press and then cut (length: 50.0 mm, width: 20.0 mm, thickness: 6.0 mm) to prepare a test piece. A durometer hardness test was performed using a type A durometer. A pressure plate was contacted with the test piece, and the hardness was read immediately and after 10 seconds.

(Measurement of Tensile Strength)

The measurement was performed in accordance with JIS K6251 (2008). The thermoplastic elastomer of the present invention formed into a pellet as above was formed into a sheet by a twin roll, further formed into a sheet by an electrically heated press, then cut (thickness: 2.0 mm) and punched into a dumbbell No. 3 shape to prepare a test piece. The tensile speed was set to 500 mm/min.

(Measurement of Percentage Elongation at Break)

The measurement was performed in accordance with JIS K6251 (2008). The pellet-like formed article above of the thermoplastic elastomer of the present invention was formed into a sheet by a twin roll, further formed into a sheet by an electrically heated press, then cut (thickness: 2.0 mm) and punched into a dumbbell No. 3 shape to prepare a test piece. The tensile speed was set to 500 mm/min.

TABLE 1

|  |  | Example | | | | | | | |
| --- | --- | --- | --- | --- | --- | --- | --- | --- | --- |
|  |  | 1 | 2 | 3 | 4 | 5 | 6 | 7 | 8 |
| Acid-modified SEBS | | 70 | 75 | 80 | 70 | 75 | 80 | 75 | 75 |
| SPS | | 30 | 25 | 20 | 30 | 25 | 20 | 25 | 25 |
| Hydrogenated DCPD | | 0 | 0 | 0 | 10 | 10 | 10 | 0 | 0 |
| Phenolic antioxidant | | 1.5 | 1.5 | 1.5 | 1.5 | 1.5 | 1.5 | 0.5 | 1.5 |
| Phosphorous acid ester-based antioxidant | | 2.0 | 2.0 | 2.0 | 2.0 | 2.0 | 2.0 | 2.0 | 1.0 |
| Measured value | Sealing property (kPa) | 200 or more | 200 or more | 200 or more | 200 or more | 200 or more | 200 or more | 200 or more | 200 or more |
| Evaluation | Sealing property | A | A | A | A | A | A | A | A |
|  | Adhesiveness | A | A | A | A | A | A | A | A |
|  | Heat resistance | A | A | A | A | A | A | A | A |

TABLE 2

|  |  | Example | | | | | | |
| --- | --- | --- | --- | --- | --- | --- | --- | --- |
|  |  | 9 | 10 | 11 | 12 | 13 | 14 | 15 |
| Acid-modified SEBS | | 75 | 75 | 75 | 75 | 75 | 75 | 75 |
| SPS | | 25 | 25 | 25 | 25 | 25 | 25 | 25 |
| Hydrogenated DCPD | | 0 | 5 | 20 | 0 | 0 | 0 | 0 |
| Phenolic antioxidant | | 1.5 | 1.5 | 1.5 | 0.2 | 1.5 | 2.0 | 1.5 |
| Phosphorous acid ester-based antioxidant | | 3.0 | 2.0 | 2.0 | 2.0 | 0.5 | 2.0 | 4.0 |
| Measured value | Sealing property (kPa) | 200 or more | 200 or more | 200 or more | 200 or more | 200 or more | 150 | 130 |
| Evaluation | Sealing property | A | A | A | A | A | B | B |
|  | Adhesiveness | A | A | A | A | A | B | B |
|  | Heat resistance | A | A | A | B | B | B | B |

TABLE 3

|  | Comparative Example | | | | |
|---|---|---|---|---|---|
|  | 1 | 2 | 3 | 4 | 5 |
| Acid-modified SEBS | 90 | 50 | 30 | 90 | 75 |
| SPS | 10 | 50 | 70 | 10 | 25 |
| Hydrogenated DCPD | 0 | 0 | 0 | 10 | 30 |
| Phenolic antioxidant | 1.5 | 1.5 | 1.5 | 1.5 | 1.5 |
| Phosphorous acid ester-based antioxidant | 2.0 | 2.0 | 2.0 | 2.0 | 2.0 |
| Measured value Sealing property (kPa) | 200 or more | 30 | 10 | 200 or more | 200 or more |
| Evaluation Sealing property | A | C | C | A | A |
| Adhesiveness | A | C | C | A | A |
| Heat resistance | C | B | B | C | C |

TABLE 4

|  |  | Example 1 | Example 4 | Comparative Example 1 | Comparative Example 4 |
|---|---|---|---|---|---|
| Acid-modified SEBS | | 70 | 70 | 90 | 90 |
| SPS | | 30 | 30 | 10 | 10 |
| Hydrogenated DCPD | | 0 | 10 | 0 | 10 |
| Phenolic antioxidant | | 1.5 | 1.5 | 1.5 | 1.5 |
| Phosphorous acid ester-based antioxidant | | 2.0 | 2.0 | 2.0 | 2.0 |
| Measured value | Specific gravity | 0.96 | 0.97 | 0.94 | 0.95 |
|  | Hardness (immediately) | 86 | 85 | 84 | 82 |
|  | Hardness (after 10 seconds) | 85 | 84 | 82 | 79 |
|  | Tensile strength (MPa) | 13.5 | 17.3 | 15.6 | 28 |
|  | Percentage elongation at break (%) | 400 | 450 | 530 | 600 |

In the case of the formed article obtained using the thermoplastic elastomer resin composition of the present invention, as shown by Examples 1 to 15 in Tables 1 and 2, good results were obtained in all of sealing property, adhesiveness and heat resistance, and it is confirmed that the formed article has sealing property, adhesiveness and heat resistance required particularly when mold-forming it to closely adhere to the terminal fitting or the coat part of the electric wire. On the other hand, in the case of the formed article of Comparative Example, as shown by Comparative Examples 1 to 5 in Table 3, good results were not obtained in at least one of sealing property, adhesiveness and heat resistance, and the formed article does not have sealing property, adhesiveness and heat resistance required particularly when mold-forming it to closely adhere to the terminal fitting or the coat part of the electric wire.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2009-185657) filed on Aug. 10, 2009, the contents of which are incorporated herein by way of reference.

INDUSTRIAL APPLICABILITY

The thermoplastic elastomer composition of the present invention can be processed by mold forming and at the same time, is excellent in the sealing property and recycling property, and therefore, the composition can be utilized for a connector member of automobiles, home electric appliance, and the like.

DESCRIPTION OF REFERENCE NUMERALS AND SIGNS

| 1, 1A | Connector |
|---|---|
| 2 | Terminal fitting |
| 3 | Housing part |
| 4, 4A | Water-stopping part |
| 6 | Electric wire |
| 6a | End |
| 21 | Electric contact part |
| 22 | Electric wire connection part |
| 33, 33A | Electric wire lead-out port |
| 52 | O-ring (seal member) |

The invention claimed is:

1. A thermoplastic elastomer resin composition comprising 100 parts by weight of a base resin containing from 60 to 80 wt % of an acid-modified styrene-based elastomer and from 40 to 20 wt % of a syndiotactic polystyrene, from 0 to 20 parts by weight of a hydrogenated dicyclopentadiene, from 0.5 to 1.5 parts by weight of a phenolic antioxidant and from 1.0 to 3.0 parts by weight of a phosphorous acid ester-based antioxidant.

2. A connector, wherein at least a part of the members are formed of the thermoplastic elastomer resin composition according to claim 1.

3. A connector comprising a terminal fitting having an electric contact part put into connection to a terminal fitting of the other-party connector and an electric wire connection part continuing from the electric contact part and being connected to the end of an electric wire, at least a part of the electric contact part being disposed in a first mold resin, the portion between the electric contact part and the first mold resin being sealed with an annular seal member, the electric wire connection part being embedded in the first mold resin, and the electric wire and the electric wire lead-out port of the first mold resin being sealed with a second mold resin, wherein the second mold resin is formed of the thermoplastic elastomer resin composition according to claim 1.

4. The connector as claimed in claim 3, wherein said first mold resin is formed of a resin composition containing at least one resin selected from the group consisting of a polystyrene-based resin, a polyamide-based resin, a polyester-based resin, a modified polyphenylene ether and a polyphenylene sulfide.

* * * * *